US006942362B1

(12) United States Patent
Deutsch et al.

(10) Patent No.: US 6,942,362 B1
(45) Date of Patent: Sep. 13, 2005

(54) LIGHTED WHISTLE

(75) Inventors: Daniel J. Deutsch, Lake Buena Vista, FL (US); Jason Barber, Orlando, FL (US); Russell Rotham, Orlando, FL (US)

(73) Assignee: Theory3, Inc., Orlando, FL (US)

( * ) Notice: Subject to any disclaimer, the term of this patent is extended or adjusted under 35 U.S.C. 154(b) by 0 days.

(21) Appl. No.: 10/714,246

(22) Filed: Nov. 14, 2003

Related U.S. Application Data

(63) Continuation-in-part of application No. 10/274,848, filed on Oct. 21, 2002, now Pat. No. 6,742,913, which is a continuation-in-part of application No. 09/756,458, filed on Jan. 9, 2001, now Pat. No. 6,467,939.

(51) Int. Cl.[7] .............................................. F21V 33/00

(52) U.S. Cl. .......................... 362/253; 362/96; 362/84; 362/86; 362/116; 362/205; 362/190

(58) Field of Search ................................ 362/96, 84, 86, 362/109, 192, 253, 116, 205, 190, 191

(56) References Cited

U.S. PATENT DOCUMENTS

| | | | | | |
|---|---|---|---|---|---|
| 1,930,504 | A | * | 10/1933 | Benjafield | 446/204 |
| 4,314,316 | A | * | 2/1982 | Gertler et al. | 362/86 |
| 4,449,474 | A | * | 5/1984 | Mariol | 116/2 |
| 5,124,898 | A | * | 6/1992 | Chabria | 362/253 |
| 5,826,534 | A | * | 10/1998 | Huang | 116/137 R |
| 6,329,927 | B1 | * | 12/2001 | Hobson | 340/815.69 |
| 6,582,097 | B2 | * | 6/2003 | Chang | 362/253 |
| 6,776,503 | B1 | * | 8/2004 | Chang | 362/201 |

* cited by examiner

*Primary Examiner*—Laura K. Tso
(74) *Attorney, Agent, or Firm*—Allen, Dyer, Doppelt, Milbrath & Gilchrist, P.A.

(57) ABSTRACT

Described is an apparatus for a lighted whistle connectable to a predetermined article. A housing forms an outer shape of said whistle and has therein an inner cavity. A mouthpiece adapted for a user to blow air thereinto has an opening in fluid connection with said inner cavity and a sound hole opening providing an air outlet from said inner cavity. A power source is connected in an electrical circuit with a light source and a switch. A connector for connecting said whistle to a predetermined article is positioned on the housing.

23 Claims, 3 Drawing Sheets

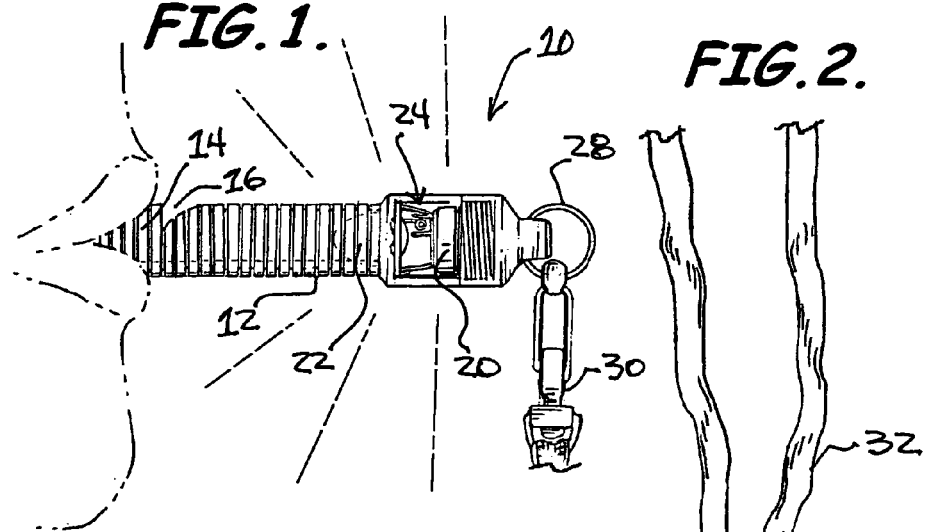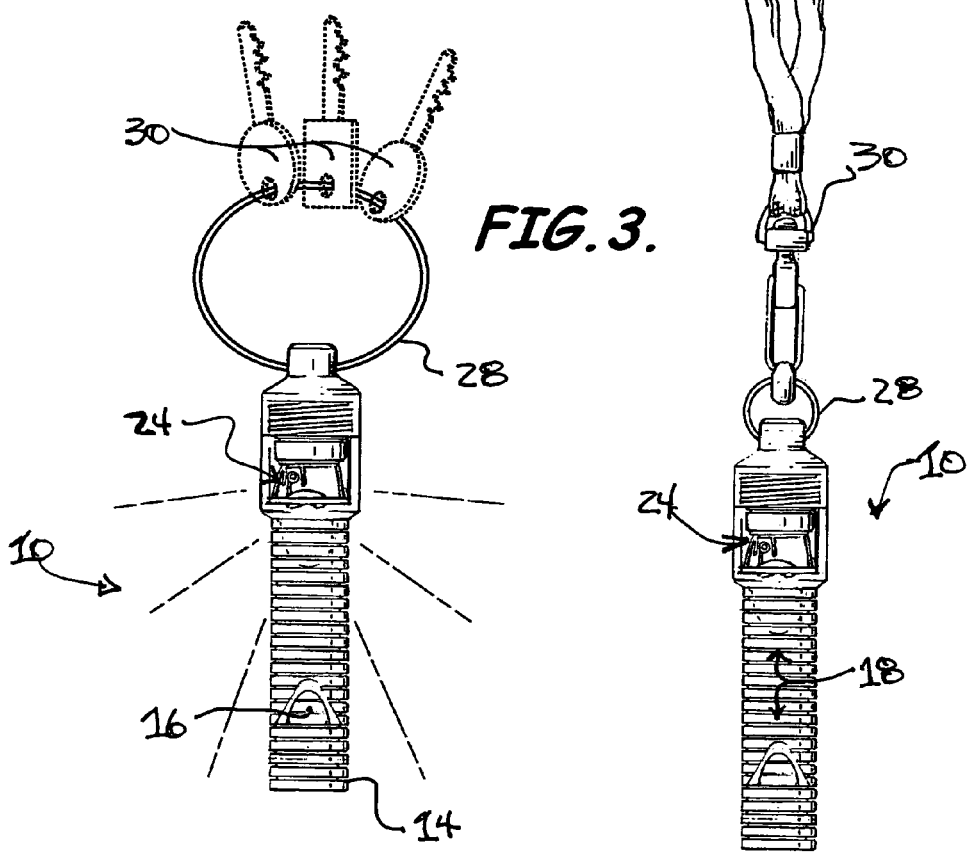

US 6,942,362 B1

LIGHTED WHISTLE

RELATED APPLICATION

This application is a continuation-in-part of and claims priority from application Ser. No. 10/274,848, filed on Oct. 21, 2002, now U.S. Pat. No. 6,742,913, which is a continuation-in-part of application Ser. No. 09/756,458, which was filed on Jan. 9, 2001, now U.S. Pat. No. 6,467,939, and which applications are incorporated herein by reference in their entirety.

FIELD OF THE INVENTION

The present invention relates to the field of whistles and, more particularly, to a whistle having a light and structured for connection to a variety of items or to be worn by a user, particularly as a pendant.

BACKGROUND OF THE INVENTION

Accessory lights of various kinds have become popular for enhancing the appearance of clothing and utilitarian articles. Some such accessory lights may additionally provide added visibility to the wearer in low light conditions, thereby serving as aids in promoting the user's safety.

SUMMARY OF THE INVENTION

With the foregoing in mind, the present invention describes a whistle comprising a light source therein to provide illumination and increased visibility for the user.

The present lighted whistle preferably comprises a housing which forms the whistle and has a connector for connecting the whistle to a predetermined article; a power source positioned within the housing; a light source positioned within the housing and connected to the power source; and a switch positioned within the housing connected to the power source and to the light source so as to energize the light source. The switch may be a manually operated switch, may include a photo sensor responsive to the level of ambient light, may be preferably responsive to motion, or may include a combination of such switches. A preferred switch is motion activated, and is responsive to motion energy such as vibration, for example vibration generated by walking or other physical movements by a person wearing the lighted whistle. The light source is energized when the switch or combination of switches is activated, thereby lighting not only the whistle itself but also the article to which the light is connected, and increasing the visibility of the person wearing the whistle.

In a preferred embodiment of the invention, the housing provides both the structural features of the whistle, an enclosure for protecting the electrical components of the lighted whistle and, preferably, also serves to connect the whistle to an article, or to a lanyard serving to allow wearing the lighted whistle as a pendant. The housing comprises a material which allows light emitted by the light source to shine therethrough so that it may be seen by an observer. In a most preferred embodiment, the housing material includes a fluorescent compound responsive to light emitted by the light source, so that the lighted whistle device glows with fluorescence.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 1 is a side elevation view of the lighted whistle of the present invention, in use by a person;

FIG. 2 shows the whistle of FIG. 1 in use connected to a lanyard suitable for wearing the whistle as a pendant;

FIG. 3 illustrates the whistle of FIG. 1 in use connected in a key ring;

Figure 4:
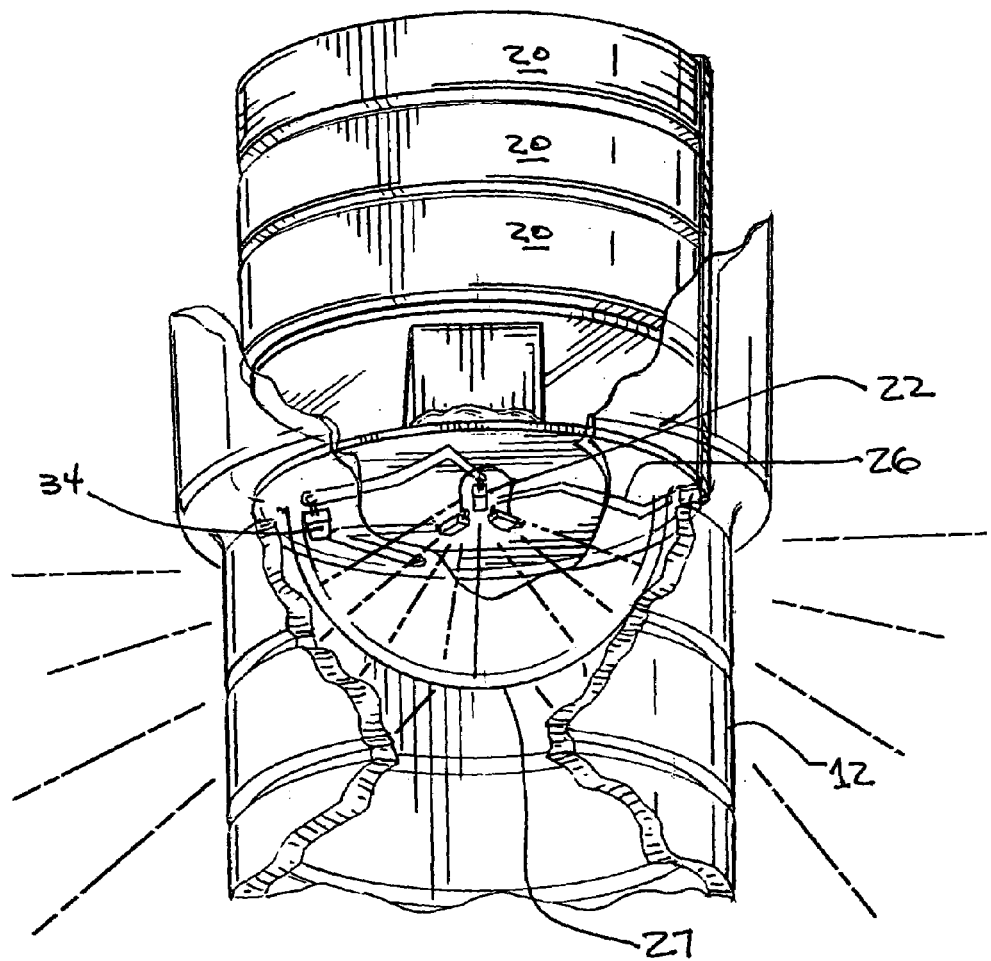
FIG. 4 is a cutaway view of the present lighted whistle showing a light source made with chip-on-board light-emitting diodes.

The whistle of claim 1, wherein said power source, light source, and switch are positioned within said housing is a compartment separated from said inner cavity.

The whistle of claim 1, wherein said housing is substantially waterproof.

DETAILED DESCRIPTION OF THE PREFERRED EMBODIMENT

The present invention will now be described more fully hereinafter with reference to the accompanying drawings, in which preferred embodiments of the invention are shown. Unless otherwise defined, any technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. Any publications, patent applications, patents, and other references mentioned herein are incorporated by reference in their entirety. In case of conflict, however, the present specification, including any definitions, will control. In addition, the materials, methods and examples given are illustrative in nature only and not intended to be limiting. Accordingly, this invention may be embodied in many different forms and should not be construed as limited to the illustrated embodiments set forth herein. Rather, these illustrated embodiments are provided solely for exemplary purposes so that this disclosure will be thorough and complete, and will fully convey the scope of the invention to those skilled in the art. Other features and advantages of the invention will be apparent from the following detailed description and from the claims.

FIGS. 1 through 5 illustrate the present invention, a lighted whistle 10. The lighted whistle 10 preferably comprises a housing 12 which forms the outer form and structure of a typical whistle, and also encloses the electrical components of the device. A first portion of the housing defines the whistle and includes a mouthpiece 14 or nozzle, a sound hole 16, and an inner cavity 18. A second portion of the housing encloses the electrical components of the device preferably adjacent the inner cavity 18 of the whistle 10. These electrical components include a power source 20, a light source 22, and a switch 24 connected in a circuit 26 together with the power source and light source. The light source may also include a protective clear dome or lens 27 which may also double as or form part of a wall separating the inner cavity of the whistle from a compartment holding the electrical components of the device. The housing 12 also provides a connector 28 serving to connect the lighted whistle 10 to a desired article 30, which could be a lanyard allowing wearing the lighted whistle as a pendant.

As known in the art, a "whistle" comprises a small wind instrument for making whistling sounds by means of the breath. Typically, but not exclusively, a whistle will emit a high-pitched, shrill, or sharp musical sound useful for attracting attention. Some whistles, but not all, will include a small ball free in the sound cavity of the whistle. The ball rattles around the cavity when a user blows air into the whistle and intermittently blocks the sound hole so as to produce a sound characterized by very short interruptions. The skilled should understand, however, that while a particular type of whistle is shown in the figures for purposes of illustration, the invention is intended to include all other styles of whistles as well.

The power source 20, preferably at least one battery, is positioned within the housing 12 connected in the electrical circuit 26. A light source 22, which those skilled in the art will know may be any suitable light, but which preferably includes at least one light emitting diode (LED), is positioned within the housing 12 and is connected to the power source 20 through the electrical circuit 26. A switch 24 is connected to the power source 20 and to the light source 22 through the electrical circuit 26 so as to close the circuit and energize the light source 22, provided there are no other switches open in the circuit. A preferred switch 24 is a motion sensitive switch, such as a tremor switch, which will automatically close the circuit in response to movement of the device. As described above, the switch 24 in the invention may include a single device which may be manually operated, or may be motion sensitive, or photosensitive, or may include more than one of these devices in the electrical circuit. For example, a photosensitive switch would prevent energizing of the light source 22 when ambient light is sufficient.

The present invention, as shown in FIGS. 2–3, includes the lighted whistle 10 in combination with a connector 28 which engages with the lighted whistle, the connector serving for connecting the lighted whistle to a predetermined article 30. The skilled will recognize, however, that the lighted whistle 10 may be manufactured having the first and second portions of the housing being one integral part or being separable, for example, to provide access to the power source 20 so as to allow a user to change it for a new battery when needed.

In any embodiment, the connector may include a device such as a cord or lanyard 32, as shown in FIG. 2, for hanging the light from an article. A ring 33 as commonly employed for key chains and shown in FIG. 3 may also be used, or both a lanyard and ring. A cord or lanyard, as described and shown in FIG. 2, could serve depending on length to wear the disclosed lighted whistle as a pendant around the neck or other body part of the user.

As noted above, the housing 12 for the lighted whistle 10, best shown in FIGS. 1–3 and 5, preferably comprises a translucent or transparent material so as to allow light emitted by the light source 22 to shine through the housing. In addition, the housing 12 preferably is best fabricated from ultrasonically sealed plastic material, thereby comprising a substantially waterproof enclosure for the electrical components of the lighted whistle 10. The lighted source 22 may be configured to emit light in one or more colors. The light source 22 itself may emit colored light, or may include multiple individual light sources or LEDS such as shown in FIG. 4, each emiting a different color. Additionally, the housing 12 may comprise material having one or more colors to thereby produce multiple colors as the light source is energized. Most preferably in such an embodiment the light source 16 is capable of emitting a plurality of colors and may be controlled by a microprocessor chip 34 to emit such colors sequentially or in any other desired pattern.

In yet another preferred embodiment of the invention, the light source 22 may preferably be a light-emitting diode (LED) which emits at least some light in the ultraviolet or near-ultraviolet range (UV-LED), and the housing 12 may be fabricated to include a fluorescent compound responsive to the ultraviolet or near-ultraviolet light. The skilled will know that various fluorescent compounds are available which fluoresce in predetermined colors responsive to UV or near-UV light. For example, fluorescein isothiocyanate fluoresces in a yellow-green color, rhodamine compounds fluoresce in a reddish color, and calcofluor white fluoresces in a bright yellow-white light.

Particularly useful and aesthetic applications of this aspect of the invention include forming the housing 12 to display an emblem or image which is lit as movement begins. The image may advantageously comprise an advertisement. Such an advertisement may include a corporate mark or a team logo, for example, for a professional or collegiate athletic team. In such an embodiment the light source 22 could emit light coordinated with the team's colors.

A preferred embodiment of the invention is shown in FIGS. 1–3 and 5, wherein the lighted whistle includes a motion sensitive switch which has a first contact electrically connected to a pole of the power source. The power source or sources and the remaining electrical components are preferably positioned in a compartment separated from the whistle's inner cavity 18 and spaced apart from the whistle's mouthpiece 14. A cap 36, which is preferably matingly threaded with the remaining portion of the whistle housing 12, closes off the compartment wherein the electrical components are positioned. A coil spring 38 or other biasing member is positioned between the cap 36 and the power source(s) 20 and urges the batteries into the switch for closing an electrical contact when the cap is sufficiently tightened onto the whistle housing. This is, of course, in a manually operable switch embodiment of the invention as shown in FIGS. 1–3, wherein the switch is operated by tightening the cap onto the batteries.

Figure 5:
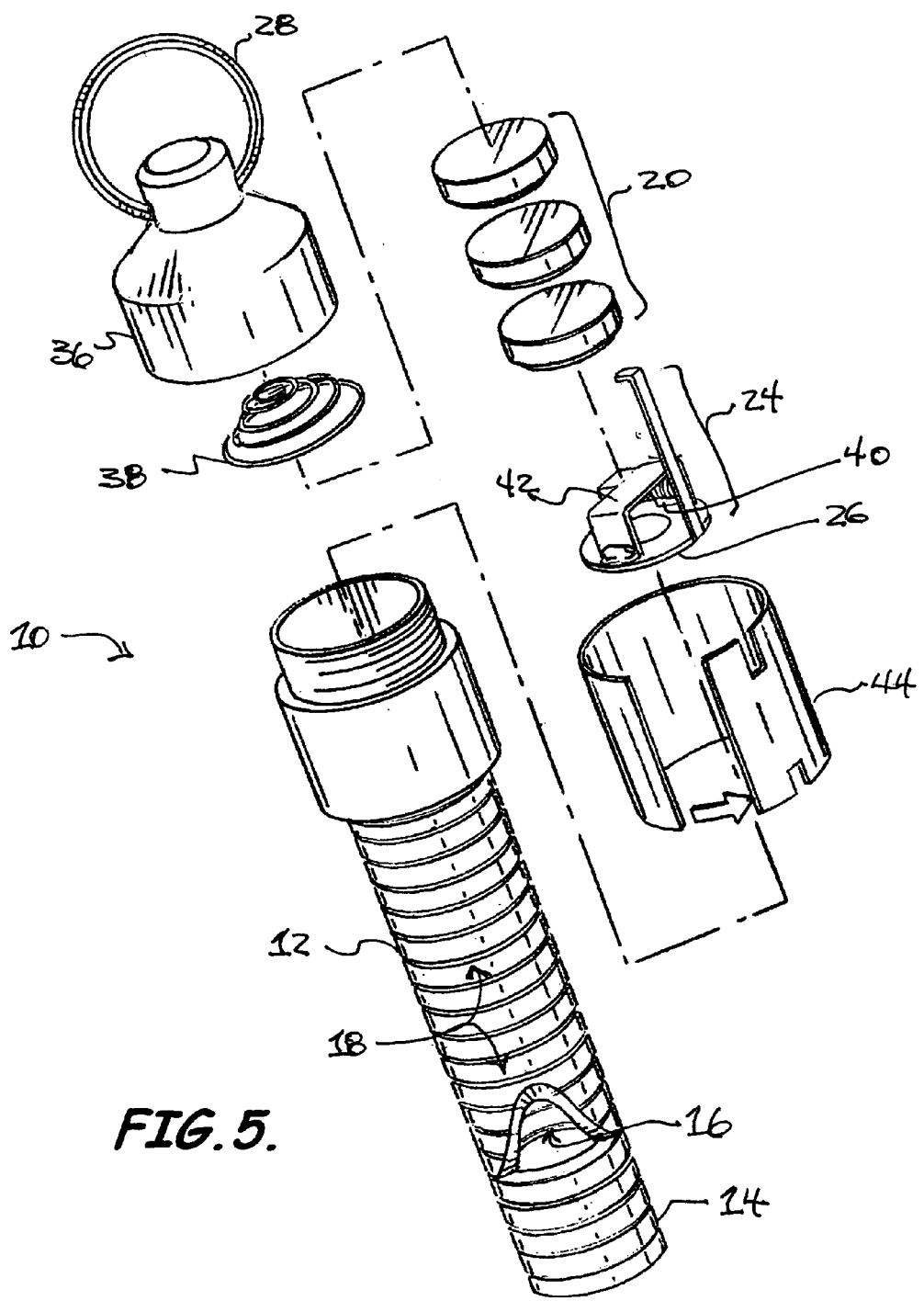
FIG. 5. is an exploded view of the lighted whistle of FIG. 1 showing the electrical components according to a preferred embodiment of the present invention.

In a motion sensitive switch embodiment of the invention, as shown in FIG. 5, the first contact is positioned suspended adjacent a second contact, which in this case is a switch contact plate. Movement of the lighted whistle device 10 causes the first contact, a small contact spring 40, to vibrate sufficiently to touch the second contact 42, thereby closing the electrical circuit, and energizing the light source. When movement ceases, vibration of the switch contact is reduced and eventually stops, the first contact moves away from the second contact, and the electrical circuit is opened, turning off the light source. As seen in FIG. 5, a sleeve 44 may be employed to stabilize the position of the electrical components in relation to one another. If desired, the sleeve 42 may be metallic and may be incorporated into the electrical circuit. In this embodiment a first contact is preferably a spring coil 38 formed from a wire which is electrically connected to a pole of the power source, as shown in FIG. 5. The vibrational characteristics of the first contact 38 depend on factors known in the art, including the gauge of wire used to make the spring coil, the number of coils in the spring, the tensile strength of the wire and, therefore, its bendability. Careful control of such characteristics will allow fabrication of a contact of predetermined sensitivity to motion, and of predetermined residual contact after motion stops. A microprocessor chip 34 positioned on the circuit board 26 may also be configured for controlling the rate at which the light source is energized.

For example, the chip 34 can minimize the energizing of the light source 22 due to random movement such as experienced during shipment. Additionally, the chip 34 could be configured to provide a low power use mode responsive to random movement of the whistle, thereby helping conserve energy in the power source.

The invention may be used in a variety of ways. For example, it could be used by a runner or a person walking, particularly at night or in low light conditions, both to increase the visibility of the person to others and to provide a sound signal which could be used in emergencies. The lighted whistle would also be very useful if connected to a personal flotation device such as used in boats and personal water craft. A person falling overboard would be more easily located by both the sound signal and the emitted light. Uses to which the invention may be put are only limited by the user's imagination.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

What is claimed is:

1. A lighted whistle comprising:
   a housing forming said whistle and having therein an inner cavity, having a mouthpiece adapted for a user to blow air thereinto, said mouthpiece having an entrance opening in fluid connection with said inner cavity and having a sound hole opening providing an outlet for air from said inner cavity, said housing being at least partly translucent and containing a fluorescent material responsive to ultraviolet or near ultraviolet light;
   an electrical circuit adapted for connecting a power source thereto;
   a light source connected to said electrical circuit, said light source capable of emitting sufficient ultraviolet or near ultraviolet light to excite the fluorescent material;
   at least one switch connected in the electrical circuit; and
   a connector for connecting said whistle to a predetermined article.

2. The whistle of claim 1, wherein said connector comprises a split ring.

3. The whistle of claim 1, wherein said connector comprises a lanyard.

4. The whistle of claim 1, wherein said predetermined article comprises a key chain.

5. The whistle of claim 1, wherein said power source comprises a battery.

6. The whistle of claim 1, wherein said light source comprises at least one light emitting diode (LED).

7. The whistle of claim 1, wherein said at least one switch includes a manually operable switch.

8. The whistle of claim 1, wherein said at least one switch includes a motion sensitive switch automatically closing responsive to movement of the whistle and without user intervention.

9. The whistle of claim 1, wherein said connector is positioned along an external surface of said housing spaced apart and generally opposite from said mouthpiece.

10. The whistle of claim 1, wherein said housing is entirely translucent and made of a material containing said fluorescent material.

11. The whistle of claim 1, wherein said power source, light source, and switch are positioned within said housing is a compartment separated from said inner cavity.

12. The whistle of claim 1, wherein said housing is substantially waterproof.

13. A method of lighting a whistle, the method comprising:
    providing a housing forming said whistle and having therein an inner cavity, having a mouthpiece adapted for a user to blow air thereinto, said mouthpiece having an entrance opening in fluid connection with said inner cavity and having a sound hole opening providing an outlet for air from said inner cavity, said housing being at least partly translucent and containing a fluorescent material responsive to ultraviolet or near ultraviolet light;
    positioning within the housing a power source connected in an electrical circuit;
    connecting a light source to the power source through the electrical circuit, said light source capable of emitting sufficient ultraviolet or near ultraviolet light to excite the fluorescent material;
    including at least one switch connected in the electrical circuit; and
    attaching a connector to the housing for connecting said whistle to a predetermined article.

14. The method of claim 13, wherein the connector comprises a split ring.

15. The method of claim 13, wherein the connector comprises a lanyard.

16. The method of claim 13, wherein the predetermined article comprises a key chain.

17. The method of claim 13, wherein the power source comprises a battery.

18. The method of claim 13, wherein the light source comprises at least one light emitting diode (LED).

19. The method of claim 13, wherein the at least one switch includes a manually operable switch.

20. The method of claim 13, wherein the at least one switch includes a motion sensitive switch automatically closing responsive to movement of the whistle and without user intervention.

21. The method of claim 13, wherein the connector is positioned along an external surface of the housing spaced apart and generally opposite from the mouthpiece.

22. The method of claim 13, wherein said power source, light source, and switch are positioned within said housing is a compartment separated from said inner cavity.

23. The method of claim 13, wherein said housing is substantially waterproof.

* * * * *